US012086421B2

(12) United States Patent
Mirichigni et al.

(10) Patent No.: US 12,086,421 B2
(45) Date of Patent: Sep. 10, 2024

(54) MEMORY DEVICE WITH DATA SCRUBBING CAPABILITY AND METHODS

(71) Applicant: Micron Technology, Inc., Boise, ID (US)

(72) Inventors: Graziano Mirichigni, Vimercate (IT); Corrado Villa, Sovico (IT); Andrea Martinelli, Bergamo (IT); Christophe Vincent Antoine Laurent, Agrate Brianza (IT)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 17/684,112

(22) Filed: Mar. 1, 2022

(65) Prior Publication Data

US 2023/0176747 A1    Jun. 8, 2023

Related U.S. Application Data

(63) Continuation of application No. PCT/IB2021/022238, filed on Dec. 2, 2021.

(51) Int. Cl.
*G06F 3/06* (2006.01)
(52) U.S. Cl.
CPC ............ *G06F 3/0619* (2013.01); *G06F 3/065* (2013.01); *G06F 3/0659* (2013.01); *G06F 3/0679* (2013.01)
(58) Field of Classification Search
CPC ...... G06F 3/0619; G06F 3/065; G06F 3/0659; G06F 3/0679
USPC .................................................. 711/154, 100
See application file for complete search history.

(56) References Cited

U.S. PATENT DOCUMENTS

| | | | |
|---|---|---|---|
| 2009/0125788 A1* | 5/2009 | Wheeler | G06F 11/106 714/764 |
| 2015/0039842 A1* | 2/2015 | Fitzpatrick | G11C 11/5642 711/154 |
| 2016/0155491 A1* | 6/2016 | Roberts | G11C 11/40607 711/106 |
| 2016/0246679 A1 | 8/2016 | Kim et al. | |
| 2017/0060681 A1* | 3/2017 | Halbert | G06F 3/064 |
| 2018/0188981 A1* | 7/2018 | Alavi | G11C 16/349 |
| 2018/0329777 A1 | 11/2018 | Gilda et al. | |
| 2020/0089564 A1* | 3/2020 | Chao | G06F 13/24 |
| 2021/0019241 A1 | 1/2021 | Singidi et al. | |

OTHER PUBLICATIONS

International Search Report and Written Opinion, PCT/IB2021/022238, mailed on Aug. 19, 2022.

* cited by examiner

*Primary Examiner* — David Yi
*Assistant Examiner* — Zubair Ahmed
(74) *Attorney, Agent, or Firm* — Greenberg Traurig

(57) ABSTRACT

A method to perform data scrub operations by operating a memory device, the memory device comprising a main memory, an internal Error Correction Code (ECC) engine and a scrub memory. The method comprising: receiving a read command; accessing, based on the receiving the read command, a location in the main memory to read data at the location; error correcting data read during the accessing; and storing at the scrub memory information of the location based at least in part on the correcting the data meeting or exceeding an ECC threshold.

29 Claims, 13 Drawing Sheets

| OP[7] | OP[6] | OP[5] | OP[4] | OP[3] | OP[2] | OP[1] | OP[0] |
|---|---|---|---|---|---|---|---|
| Maintenance Count (nMC) | | | | | | | |

| Function | Register Type | Operand | Data | | Notes |
|---|---|---|---|---|---|
| Maintenance Count (nMC) | R | OP[7:0] | $00000000_B$: | Reserved | $2^n \cdot 1024$ |
| | | | $00000001_B$: | 1024 | |
| | | | $00000010_B$: | 2048 | |
| | | | $00000011_B$: | 3072 | |
| | | | ... | ... | |
| | | | $11111111_B$: | 261120 | |

FIGURE 8

| OP[7] | OP[6] | OP[5] | OP[4] | OP[3] | OP[2] | OP[1] | OP[0] |
|---|---|---|---|---|---|---|---|
| Average Maintenance Interval (tMI) | | | | | | | |

| Function | Register Type | Operand | Data | | Notes |
|---|---|---|---|---|---|
| Average Maintenance Interval (tMI) | R | OP[7:0] | $00000000_B$: | Reserved | $2^n \cdot 9.2us$ |
| | | | $00000001_B$: | 9.2us | |
| | | | $00000010_B$: | 18.3us | |
| | | | $00000011_B$: | 37us | |
| | | | ... | ... | |
| | | | $11111111_B$: | 2346us | |

FIGURE 9

| Function | Q | Command/Address Signal Rising CLK_t | | | | | | | | Command/Address Signal Falling CLK_t | | | | | | | | |
|---|---|---|---|---|---|---|---|---|---|---|---|---|---|---|---|---|---|---|
| RFP2 | L | H | H | H | L | L | B0 | B1 | B2 | B3 | B4 | B5 | B6 | B7 | B8 | | Maintenance Operation |
| RFP1 | L | H | H | L | L | H | RFU | RFU | RFU | RFU | RFU | RFU | RFU | RFU | V | | Reserved for future Use |
| MPC | L | H | H | H | H | L | OP0 | OP1 | OP2 | OP3 | OP4 | OP5 | OP6 | OP7 | V | | Multipurpose Command |

1300

1301 Receiving a read command

1302 Accessing, based on the receiving the read command, a location in the main memory region to read data at the location 1303 Error correcting data read during the accessing 1304 Storing at the scrub memory information of the location based at least in part on the correcting the data meeting or exceeding an ECC threshold FIGURE 13a

MEMORY DEVICE WITH DATA SCRUBBING CAPABILITY AND METHODS

RELATED APPLICATIONS

The present application is a continuation application of Int. Pat. App. No. PCT/IB2021/022238, filed Dec. 2, 2021, the entire disclosures of which are hereby Incorporated herein by reference.

TECHNICAL FIELD

The present disclosure relates generally to memory devices and more specifically, to memory devices with data scrubbing capability.

BACKGROUND

Memory devices are widely used to store information in various electronic devices such as computers, wireless communication devices, cameras, digital displays, and the like. Information is stored by programing different states of a memory device. For example, binary devices have two states, often denoted by a logic "1" or a logic "0." In other systems, more than two states may be stored. To access the stored information, a component of the electronic device may read, or sense, the stored state in the memory device. To store information, a component of the electronic device may write, or program, the state in the memory device.

Various types of memory devices exist, including magnetic hard disks, random access memory (RAM), read only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), and others. Memory devices may be volatile or non-volatile. Non-volatile memory, e.g., FeRAM, or chalcogenide-based memories may maintain their stored logic state for extended periods of time even in the absence of an external power source. Volatile memory cells may lose their stored state over time unless they are periodically refreshed by an external power source.

Improving memory devices may include increasing memory cell density, increasing read/write speeds, increasing reliability, increasing data retention, reducing power consumption, or reducing manufacturing costs, among other metrics. For example, improving memory devices may include increasing data retention and/or facilitating media management by the user, which may in some cases relate to improved reliability. Decreasing sensitivity to degradation or destruction of a stored logic state over time, which may in some cases relate to improved data retention and other improvements, may be desired.

BRIEF DESCRIPTION OF THE DRAWINGS

FIG. 3b illustrates an example of current-voltage (I-V) curves for memory cells programmed according to the pulses in FIG. 3a.

FIGS. 8 and 9 illustrate examples of mode registers of a memory device that supports data scrubbing capability in accordance with embodiments of the present disclosure.

FIGS. 13a-13c illustrate flowcharts illustrating several embodiments of a method to operate a memory device that supports scrubbing capability in accordance with the present disclosure.

DETAILED DESCRIPTION

In the following detailed description, reference is made to the accompanying drawings that form a part hereof, and in which is shown, by way of illustration, specific examples. The following detailed description is, therefore, not to be taken in a limiting sense, and the scope of the present disclosure is defined only by the appended claims and equivalents thereof.

Figure 1:
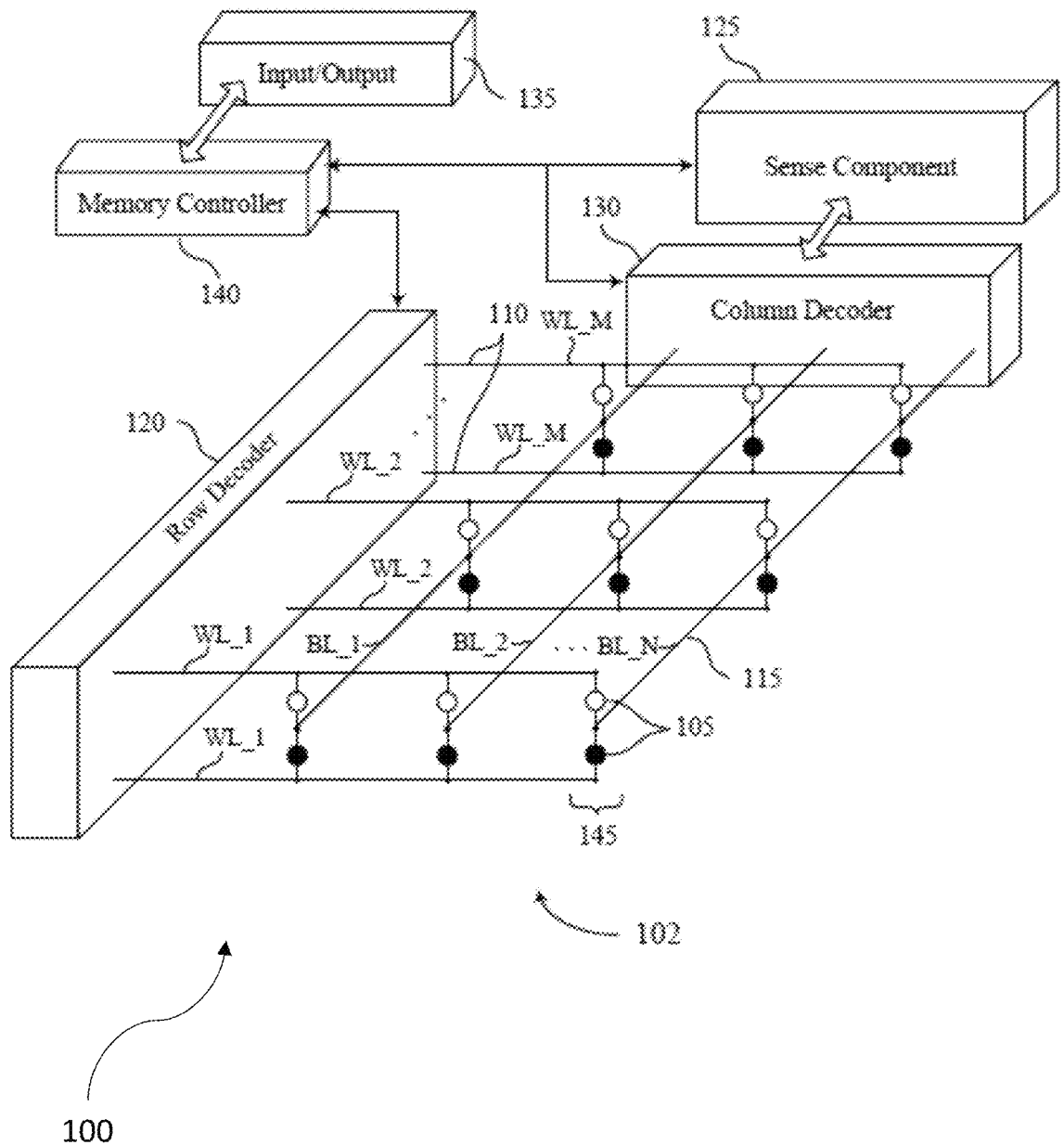
FIG. 1 illustrates an exemplary diagram of a memory device including a three-dimensional array of memory cells that supports data scrubbing capability in accordance with embodiments of the present disclosure.

FIG. 1 illustrates an exemplary diagram of a memory device including a three-dimensional array of memory cells that supports data scrubbing capability in accordance with examples as disclosed herein. Memory device 100 may also be referred to as an electronic memory apparatus. FIG. 1 is an illustrative representation of various components and features of the memory device 100. As such, it should be appreciated that the components and features of the memory device 100 are shown to illustrate functional interrelationships, not their actual physical positions within the memory device 100. In the illustrative example of FIG. 1, the memory device 100 includes a three-dimensional (3D) memory array 102. The 3D memory array 102 includes memory cells 105 that may be programmable to store different states. In some embodiments, each memory cell 105 may be programmable to store two states, denoted as a logic 0 and a logic 1. In some embodiments, a memory cell 105 may be configured to store more than two logic states. In some examples, a memory cell 105 may be configured to store one of more than two logic states. A memory cell may be configured to store analog information, according to some embodiments. A memory cell 105 may, in some embodiments, include a self-selecting memory cell. It is to be understood that the memory cell 105 may also include a memory cell of another type—e.g., a 3D XPoint™ memory cell, a PCM cell that includes a storage component and a selection component, a CBRAM cell, a FeRAM cell, or a Flash cell. Although some elements included in FIG. 1 are labeled with a numeric indicator, other corresponding elements are not labeled, though they are the same or would be understood to be similar, in an effort to increase the visibility and clarity of the depicted features.

The 3D memory array 102 may include two or more two-dimensional (2D) memory arrays formed on top of one another. This may increase a number of memory cells that may be placed or created on a single die or substrate as compared with 2D arrays, which in turn may reduce production costs, or increase the performance of the memory device, or both. The memory array 102 may include two levels of memory cells 105 and may thus be considered a 3D memory array; however, the number of levels is not limited to two and may in some cases be one or more than two. Each level may be aligned or positioned so that memory cells 105 may be aligned (exactly, overlapping, or approximately) with one another across each level, forming a memory cell stack 145.

In some embodiments, each row of memory cells 105 is connected to a word line 110, and each column of memory cells 105 is connected to a digit line 115 (sometimes referred to as a bit line). Both word lines 110 and digit lines 115 may also be generically referred to as access lines. Further, an access line may function as a word line 110 for one or more memory cells 105 at one deck of the memory device 100 (e.g., for memory cells 105 below the access line) and as a digit line 115 for one or more memory cells 105 at another deck of the memory device (e.g., for memory cells 105 above the access line). Thus, references to word lines and digit lines, or their analogues, are interchangeable without loss of understanding or operation. Word lines 110 and digit lines 115 may be substantially perpendicular to one another and may support an array of memory cells.

In general, one memory cell 105 may be located at the intersection of two access lines such as a word line 110 and a digit line 115. This intersection may be referred to as the address of the memory cell 105. A target memory cell 105 may be a memory cell 105 located at the intersection of an energized (e.g., activated) word line 110 and an energized (e.g., activated) digit line 115; that is, a word line 110 and a digit line 115 may both be energized in order to read or write a memory cell 105 at their intersection. Other memory cells 105 that are in electronic communication with (e.g., connected to) the same word line 110 or digit line 115 may be referred to as untargeted memory cells 105.

As shown in FIG. 1, the two memory cells 105 in a memory cell stack 145 may share a common conductive line such as a digit line 115. That is, a digit line 115 may be coupled with the upper memory cell 105-b and the lower memory cell 105-a. Other configurations may be possible, for example, a third layer (not shown) may share a word line 110 with the upper memory cell 105-b.

In some cases, an electrode may couple a memory cell 105 to a word line 110 or a digit line 115. The term electrode may refer to an electrical conductor, and may include a trace, wire, conductive line, conductive layer, or the like that provides a conductive path between elements or components of memory device 100. Thus, the term electrode may refer in some cases to an access line, such as a word line 110 or a digit line 115, as well as in some cases to an additional conductive element employed as an electrical contact between an access line and a memory cell 105. In some embodiments, a memory cell 105 may comprise a chalcogenide material positioned between a first electrode and a second electrode. The first electrode may couple the chalcogenide material to a word line 110, and the second electrode couple the chalcogenide material to a digit line 115. The first electrode and the second electrode may be the same material (e.g., carbon) or different material. In other embodiments, a memory cell 105 may be coupled directly with one or more access lines, and electrodes other than the access lines may be omitted.

Operations such as reading and writing may be performed on memory cells 105 by activating or selecting word line 110 and digit line 115. Activating or selecting a word line 110 or a digit line 115 may include applying a voltage to the respective line. Word lines 110 and digit lines 115 may be made of conductive materials such as metals (e.g., copper (Cu), aluminum (Al), gold (Au), tungsten (W), titanium (Ti)), metal alloys, carbon, conductively doped semiconductors, or other conductive materials, alloys, compounds, or the like.

In some architectures, the logic storing device of a cell (e.g., a resistive component in a CBRAM cell, a capacitive component in a FeRAM cell) may be electrically isolated from the digit line by a selection component. The word line 110 may be connected to and may control the selection component. For example, the selection component may be a transistor and the word line 110 may be connected to the gate of the transistor. Alternatively, the selection component may be a variable resistance component, which may comprise chalcogenide material. Activating the word line 110 may result in an electrical connection or closed circuit between the logic storing device of the memory cell 105 and its corresponding digit line 115. The digit line may then be accessed to either read or write the memory cell 105. Upon selecting a memory cell 105, the resulting signal may be used to determine the stored logic state. In some cases, a first logic state may correspond to no current or a negligibly small current through the memory cell 105, whereas a second logic state may correspond to a finite current.

In some cases, a memory cell 105 may include a self-selecting memory cell having two terminals and a separate selection component may be omitted. As such, one terminal of the self-selecting memory cell may be electrically connected to a word line 110 and the other terminal of the self-selecting memory cell may be electrically connected to a digit line 115.

Accessing memory cells 105 may be controlled through a row decoder 120 and a column decoder 130. For example, a row decoder 120 may receive a row address from the memory controller 140 and activate the appropriate word line 110 based on the received row address. Similarly, a column decoder 130 may receive a column address from the memory controller 140 and activate the appropriate digit line 115. For example, memory array 102 may include multiple word lines 110, labeled WL_T1 through WL_TM coupled to memory cells on a top deck and WL_B1 through WL_BM coupled to memory cells on a bottom deck, and multiple digit lines 115, labeled DL_1 through DL_N coupled to memory cells on both top and bottom decks, where M and N depend on the array size. Thus, by activating a word line 110 and a digit line 115, e.g., WL_2 and DL_3, the memory cell 105 at their intersection may be accessed.

A memory cell 105 may be read (e.g., sensed) by a sense component 125 when the memory cell 105 is accessed (e.g., in cooperation with the memory controller 140, row decoder 120, and/or column decoder 130) to determine a logic state stored by the memory cell 105. For example, the sense component 125 may be configured to sense a current or charge through the memory cell 105, or a voltage resulting from coupling the memory cell 105 with the sense component 125 or other intervening component (e.g., a signal development component between the memory cell 105 and the sense component 125), responsive to a read operation. For example, a voltage may be applied to a memory cell 105 (using the corresponding word line 110 and bit line 115) and the presence of a resulting current may depend on the applied voltage and the threshold voltage of the memory cell 105. In some cases, more than one voltage may be applied. Additionally, if an applied voltage does not result in current flow, other voltages may be applied until a current is detected by sense component 125. In some cases, the voltage may be ramped up in magnitude until a current flow is detected. In other cases, determined voltages may be applied sequentially until a current is detected. Likewise, a current may be applied to a memory cell 105 and the magnitude of the voltage to create the current may depend on the electrical resistance or the threshold voltage of the memory cell 105.

The sense component 125 may determine the logic state stored by the memory cell 105 by determining the threshold voltage of the memory cell 105. For example, the sense component 125 may determine a voltage that results in current flow to determine the threshold voltage of the memory cell 105. The sense component 125 may compare the voltage that results in current flow to a reference voltage (e.g., a demarcation read voltage $V_{dm}$). The sense component 125 may determine the logic state stored by the memory cell 105 based on whether the voltage that results in current flow is higher or lower than the reference voltage. In another example, the sense component 125 may apply a determined voltage to the memory cell 105. The sense component 125 may determine the logic state stored by the memory cell 105 based on whether current flows through the memory cell 105 at the determined voltage.

A memory cell 105 may be accessed to retrieve analog information programmed therein, in some embodiments. Sense component 125 may determine an intermediate state, e.g., a state of the cell that is between a set state and a reset state. The set state may correspond to a low threshold/low resistance/high conductivity state of the cell and the reset state may correspond to a high threshold/high resistance/low conductivity state, in some examples. When in an intermediate state, a memory cell 105 may have a threshold/resistance/conductivity that is intermediate between the corresponding values in the set and reset states. This may occur, for example, when partial programming has occurred, as it will be discussed in more detail with reference to FIG. 2b. Sense component 125 may measure a current flowing through the cell 105 when it is biased at a reading a voltage that may be applied to the memory cell 105 using the corresponding word line 110 and bit line 115. In some cases, the reading voltage may be a sub-threshold voltage, e.g., a voltage that is less than an expected threshold voltage associated with either the set or the reset states of the memory cell 105. By applying a sub-threshold voltage, the reading operation is non-destructive, e.g., the memory cell 105 does not change state and it is not disturbed.

The sense component 125 may provide an output signal indicative of (e.g., based at least in part on) the logic state stored by the memory cell 105 to one or more components (e.g., to the column decoder 130, the input/output component 135, the memory controller 140). In some examples, the detected logic state may be provided to a host device (e.g., a device that uses the memory device 100 for data storage, a processor coupled with the memory device 100 in an embedded application), where such signaling may be provided directly from the input/output component 135 or via the memory controller 140.

Sense component 125 may include various transistors or amplifiers to detect and amplify a difference in the signals, which may be referred to as latching. The detected logic state of memory cell 105 may then be output through column decoder 130 as output 135. In some cases, sense component 125 may be part of a column decoder 130 or row decoder 120. As an alternative, sense component 125 may be connected to or in electronic communication with column decoder 130 or row decoder 120. An ordinary person skilled in the art would appreciate that sense component may be associated either with column decoder or row decoder without losing its functional purpose.

In some memory architectures, accessing a memory cell 105 may degrade or destroy a logic state stored by one or more memory cells 105, and rewrite or refresh operations may be performed to return the original logic state to the memory cells 105. In architectures that include a material portion for logic storage, for example, sense operations may cause a change in the atomic configuration or distribution of a memory cell 105, thereby changing the resistance or threshold characteristics of the memory cell 105. Thus, in some examples, the logic state stored in a memory cell 105 may be rewritten after an access operation.

A memory cell 105 may be set or written by similarly activating the relevant word line 110 and digit line 115, and at least one logic value may be stored in the memory cell 105. Column decoder 130 or row decoder 120 may accept data, for example input/output 135, to be written to the memory cells 105. In case of digital storage normally one (or few) programming pulse of appropriate amplitude and duration is applied to the memory cell 105 to modify its state from set to reset state or vice-versa.

For analog programming, conveniently, a sequence of programming pulses may be applied to the memory cells 105 to progressively modify its state. Without being bound by any theoretical interpretation, state modification may imply a phase change, e.g., a modification of microscopic structure from amorphous to crystalline for a reset to set transition, in some cases. The phase change may occur via nucleation and crystal growth processes that may only involve a portion of the storage element material therefore leading to an intermediate state. Memory cells 105 with different programming sensitivity may respond differently to same programming stimuli. For example, memory cells with different thickness and/or composition may start transitioning from one state (e.g., reset/high threshold) to another state (e.g., set/low threshold) after a different number of programming pulses and modify or change their state at a different rate. In a neural-mimicking system, the same programming stimuli may be applied to memory cells 105 with different programming sensitivity to store corresponding but different analog information therein (for example a synaptic weight). Reading back the analog information previously programmed to each cell 105 in an analog memory unit, e.g., by reading its sub-threshold current, may be useful to determine the synaptic weight (or anyway the analog information). Since the multiple memory cells 105 in the analog memory unit have different programming sensitivity, the analog range that may be stored/retrieved is extended with respect to the range available with a sole memory cell.

In some examples, reading a memory cell 105 may be non-destructive. That is, the logic state of the memory cell 105 may not need to be rewritten after the memory cell 105 is read. For example, in architectures that include a material portion for logic storage, sensing the memory cell 105 may not destroy the logic state and, thus, a memory cell 105 may not need rewriting after accessing. For example, sub-threshold current measurement in PCM or self-selecting memories does not modify the state of the memory cell. However, in some examples, refreshing the logic state of the memory cell 105 may or may not be needed in the absence or presence of other access operations. For example, the logic state stored by a memory cell 105 may be refreshed at periodic intervals by applying an appropriate write or refresh pulse or bias to maintain stored logic states. Refreshing a memory cell 105 may reduce or eliminate read disturb errors or logic state corruption.

Figure 2:
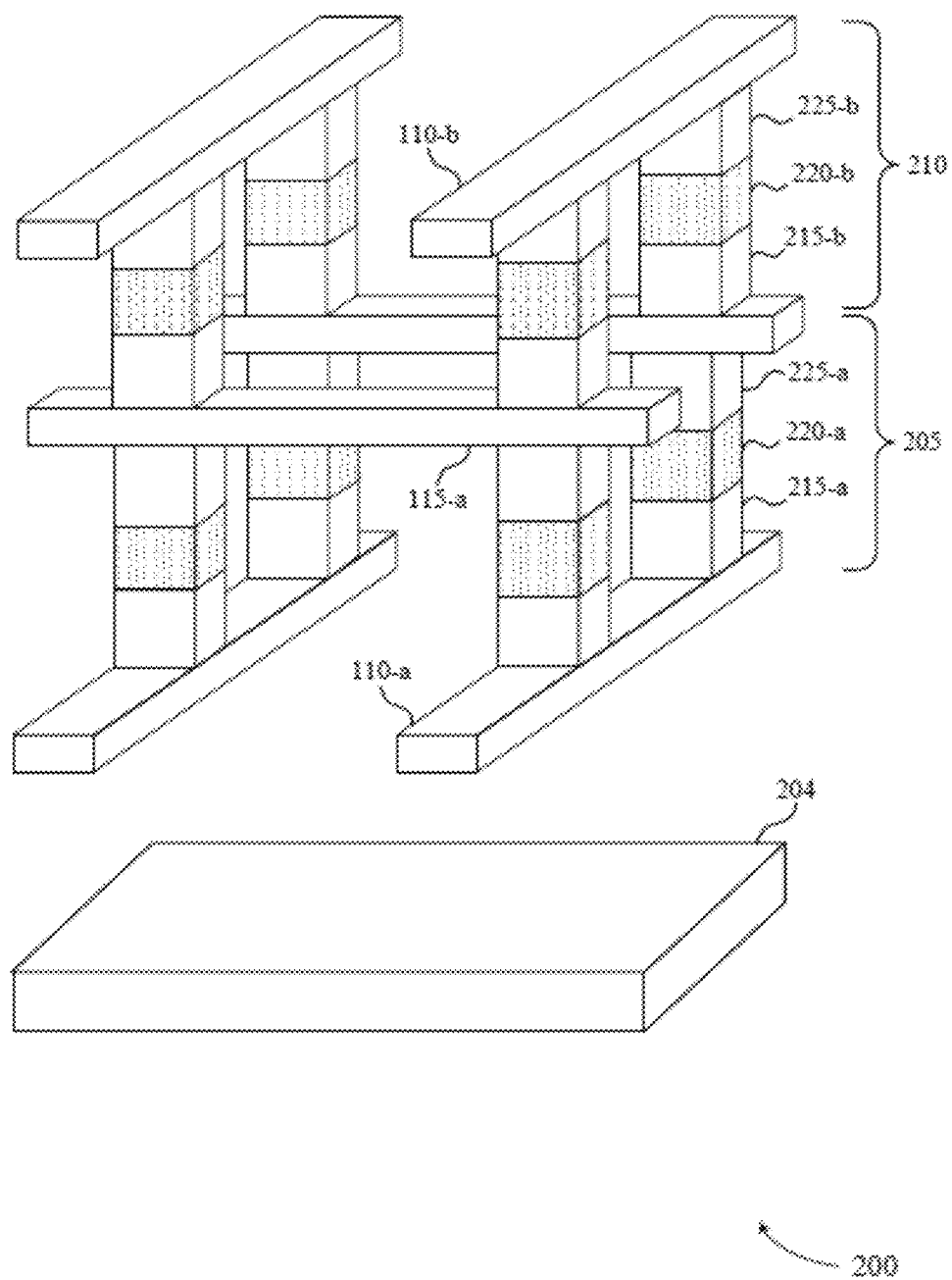
FIG. 2 illustrates an example of a memory array that supports data scrubbing capability in accordance with examples as disclosed herein.

FIG. 2 illustrates an example of a memory array 200 supporting implementations of data scrubbing capability in accordance with examples as disclosed herein. Memory array 200 may be for example a portion of the memory array 102 described with reference to FIG. 1. Memory array 200 may include a first array or deck 205 of memory cells that is positioned above a substrate 204 and second array or deck 210 of memory cells on top of the first array or deck 205. Memory array 200 may also include word lines 110-a and 110-b, and bit line 115-a, which may be examples of word line 110 and bit line 115, as described with reference to FIG. 1. Memory cells of the first deck 205 and the second deck 210 each may have one or more memory cell(s) (e.g., memory cell 220-a and memory cell 220-b, respectively). Although some elements included in FIG. 2 are labeled with a numeric indicator, other corresponding elements are not labeled, though they are the same or would be understood to be similar, in an effort to increase visibility and clarity of the depicted features.

Memory cells of the first deck 205 may include a first electrode 215-a, a memory cell 220-a (e.g., including chalcogenide material), and a second electrode 225-a. In addition, memory cells of the second deck 210 may include a first electrode 215-b, a memory cell 220-b (e.g., including chalcogenide material), and a second electrode 225-b. The memory cells of the first deck 205 and second deck 210 may, in some examples, have common conductive lines such that corresponding memory cells of each deck 205 and 210 may share bit lines 115 or word lines 110 as described with reference to FIG. 1. For example, the first electrode 215-b of the second deck 210 and the second electrode 225-a of the first deck 205 may be coupled to bit line 115-a such that bit line 115-a is shared by vertically adjacent memory cells. In accordance with the teachings herein, a decoder may be positioned above or below each deck if the memory array 200 includes more than one deck. For example, a decoder may be positioned above first deck 205 and above second deck 210. In some cases, the memory cells 220 may be examples of phase-change memory cells or self-selecting memory cells.

The architecture of memory array 200 may be referred to as a cross-point architecture, in some cases, in which a memory cell is formed at a topological cross-point between a word line and a bit line as illustrated in FIG. 2. Such a cross-point architecture may offer relatively high-density data storage with lower production costs compared to other memory architectures. For example, the cross-point architecture may have memory cells with a reduced area and, resultantly, an increased memory cell density compared to other architectures. For example, the architecture may have a 4F2 memory cell area, where F is the smallest feature size, compared to other architectures with a 6F2 memory cell area, such as those with a three-terminal selection component. For example, DRAM may use a transistor, which is a three-terminal device, as the selection component for each memory cell and may have a larger memory cell area compared to the cross-point architecture.

While the example of FIG. 2 shows two memory decks, other configurations are possible. In some examples, a single memory deck of memory cells may be constructed above a substrate 204, which may be referred to as a two-dimensional memory. In some examples, a three or four memory decks of memory cells may be configured in a similar manner in a three-dimensional cross point architecture.

In some examples, one or more of the memory decks may include a memory cell 220 that includes chalcogenide material. The memory cell 220 may, for example, include a chalcogenide glass such as, for example, an alloy of selenium (Se), tellurium (Te), arsenic (As), antimony (Sb), carbon (C), germanium (Ge), and silicon (Si). In some examples, a chalcogenide material having primarily selenium (Se), arsenic (As), and germanium (Ge) may be referred to as SAG-alloy. In some examples, SAG-alloy may include silicon (Si) or indium (In) or a combination thereof and such chalcogenide materials may be referred to as SiSAG-alloy or InSAG-alloy, respectively, or a combination thereof. In some examples, the chalcogenide glass may include additional elements such as hydrogen (H), oxygen (O), nitrogen (N), chlorine (Cl), or fluorine (F), each in atomic or molecular forms.

In some examples, a memory cell 220 including chalcogenide material may be programmed to a logic state by applying a first voltage. By way of example, when a particular memory cell 220 is programmed, elements within the cell separate, causing ion migration. Ions may migrate towards a particular electrode, depending on the polarity of the voltage applied to the memory cell. For example, in a memory cell 220, ions may migrate towards the negative electrode. The memory cell may then be read by applying a voltage across the cell to sense. The threshold voltage seen during a read operation may be based on the distribution of ions in the memory cell and the polarity of the read pulse.

In some cases, a first voltage may be applied to a first conductive line of a decoder as part of an access operation of the memory cell 220. Upon applying the first voltage, the first conductive line may be coupled with the access line (e.g., word line 110-a, word line 110-b, or bit line 115-a) associated with the memory cell 220. For example, the first conductive line may be coupled with the access line based on a doped material of the decoder which extends between the first conductive line and the access line in a first direction.

In some examples, the first voltage may be applied to the memory cell 220 based on coupling the first conductive line of the decoder with the access line. The decoder may include one or more doped materials that extend between the first conductive line and the access line of the memory array 200 of memory cells in a first direction away from a surface of the substrate 204. In some cases, the decoder may be coupled with the substrate 204.

Figure 3A:
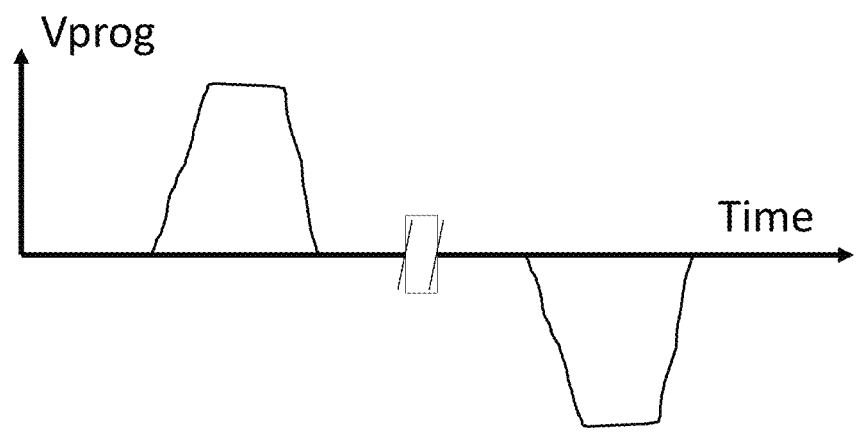
FIG. 3a illustrates an example of programming pulses of memory cells that support data scrubbing capability in accordance with embodiments of the present disclosure.
Figure 3B:
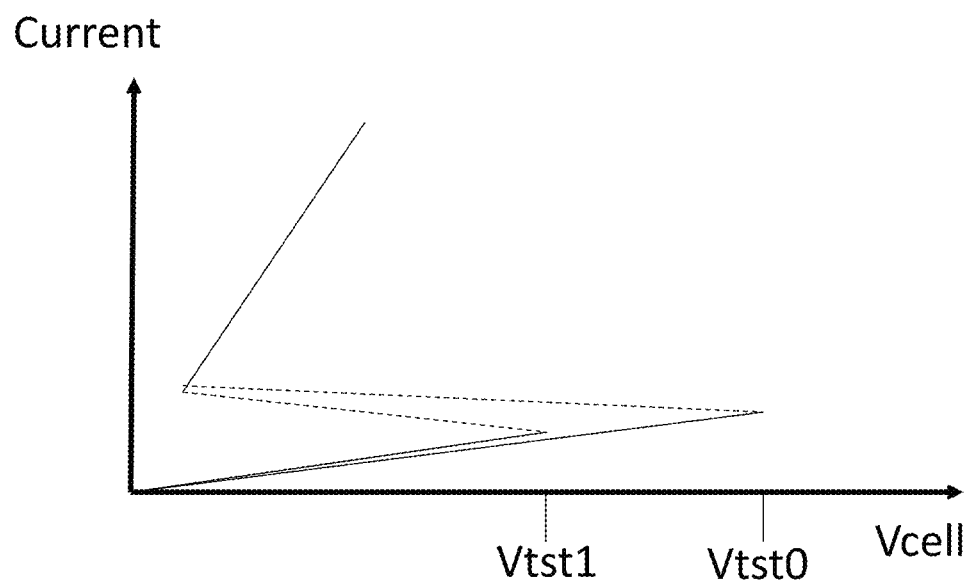
Figure 3C:
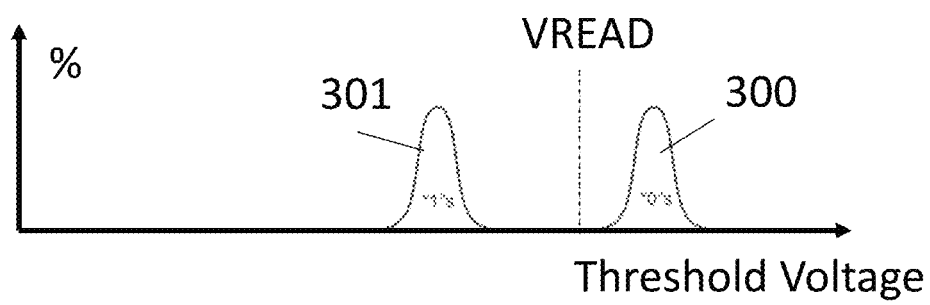
FIG. 3c illustrates threshold voltage distributions of memory cells with I-V curves shown in FIG. 3b.

FIG. 3a illustrates an example of programming pulses of memory cells that support data scrubbing capability in accordance with embodiments of the present disclosure; FIG. 3b illustrates an example of current-voltage (I-V) curves for memory cells programmed according to the pulses in FIG. 3a and FIG. 3c illustrates threshold voltage distributions of memory cells with I-V curves shown in FIG. 3b. For example, memory cells that support data scrubbing capability may be the memory cells 105, 220 described with reference to FIGS. 1-2.

FIG. 3a illustrates an example of programming pulses of memory cells 105, 220 that support data scrubbing capability in accordance with embodiments of the present disclosure; the programming pulses may be a voltage of positive polarity or negative polarity.

FIG. 3b illustrates an example of current-voltage (I-V) curves for memory cells programmed according to the pulses shown in FIG. 3a. In this example, the I-V curves in FIGS. 3b correspond to cells in which state "0" is designated as the higher threshold voltage state in a particular polarity (positive polarity direction in this example), and in which state "1" is designated as the higher threshold voltage state in the opposite polarity (negative polarity direction, not shown in this example). As noted above, the state designation can be interchanged such that state "1" could correspond to the higher threshold voltage state in the positive polarity direction with state "0" corresponding to the higher threshold voltage state in the negative direction.

FIG. 3b illustrates snapback event as described herein. Vcell can represent an applied voltage across the memory cell. For example, Vcell can be a voltage applied to a top electrode corresponding to the cell minus a voltage applied to a bottom electrode corresponding to the cell (e.g., via a respective word line and bit line). As shown in FIG. 3b, responsive to an applied positive polarity voltage (Vcell), a memory cell programmed to state "0" is in a non-conductive state until Vcell reaches voltage Vtst0, at which point the cell passes to a conductive (e.g., lower resistance) state. This transition can be referred to as a snapback event, which occurs when the voltage applied across the cell (in a particular polarity) exceeds the cell's threshold voltage. Accordingly, voltage Vtst0 can be referred to as a snapback voltage.

Similarly, voltage Vtst1 corresponds to a snapback voltage for a cell programmed to state "1". That is, as shown in FIG. 3b, the memory cell snaps back from a high impedance non-conductive state to a lower impedance conductive state when Vcell exceeds Vtst1 in the positive polarity direction.

In various instances, a snapback event can result in a memory cell switching states. For instance, if a VCell exceeding Vtst0 is applied to a state "0" cell, the resulting snapback event may reduce the threshold voltage of the cell to a level below a demarcation voltage used to determine the state of a memory cell (VREAD in FIG. 3c), which would result in the cell being read as state "1". As such, in a number of embodiments, a snapback event can be used to write a cell to the opposite state (e.g., from state "1" to state "0" and vice versa).

FIG. 3c illustrates threshold voltage distributions of memory cells with I-V curves shown in FIG. 3b. FIG. 3c illustrates threshold distributions associated with various states of memory cells, such as memory cells 105, 220 (e.g., state "0", state "1"), in accordance with a number of embodiments of the present disclosure. In FIG. 3c, the voltage Vcell may correspond to a voltage differential applied to (e.g., across) the memory cell, such as the difference between a bit line voltage (VBL) and a word line voltage (VWL) (e.g., Vcell=VBL−VWL). The threshold voltage distributions (e.g., ranges) 300, 301 may represent a statistical variation in the threshold voltages of memory cells programmed to a particular state. The distributions illustrated in FIG. 3c correspond to the I-V curves described further in conjunction with FIGS. 3a and 3b, which illustrate snapback asymmetry associated with assigned data states.

In some examples, the magnitudes of the threshold voltages of a memory cell 105, 220 in a particular state may be asymmetric for different polarities. For example, the threshold voltage of a memory cell 105, 220 may have a different magnitude in one polarity than in an opposite polarity. For example, an applied voltage magnitude sufficient to cause a memory cell 105, 220 to snap back can be different (e.g., higher or lower) for one applied voltage polarity than the other.

In various embodiments, the threshold voltage of a memory cell may drift (e.g., to a higher absolute value) over time that may be referred to as drifted states. For example, a memory cell programmed to a distribution 301 may drift toward a drifted state over time. Similarly, a memory cell programmed to a distribution 300 may also drift to a higher threshold voltage over time.

FIG. 3c illustrate a demarcation voltage VREAD, that can be used to determine the state of a memory cell (e.g., to distinguish between state "1" and state "0" as part of a read operation). In this example, VREAD is a positive voltage used to distinguish cells in state "1" (distribution 301) from cells in state "0" (distribution 300). In the examples of FIGS. 3a-3c, a memory cell 105, 220 in a positive state 0 does not snap back in response to applying VREAD; a memory cell 105, 220 in a positive state "1" snaps back in response to applying VREAD.

Embodiments are not limited to the example shown in FIG. 3c. For example, the designations of state "0" and state "1" can be interchanged (e.g., distributions 300 can be designated as state "0" and distributions 301 can be designated as state "1").

Figure 4A:
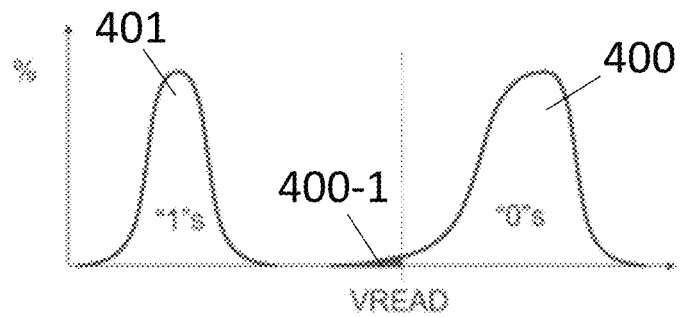
FIGS. 4a-4c illustrate threshold voltage distributions of memory cells of a memory device that supports data scrubbing capability in accordance with embodiments of the present disclosure.
Figure 4B:
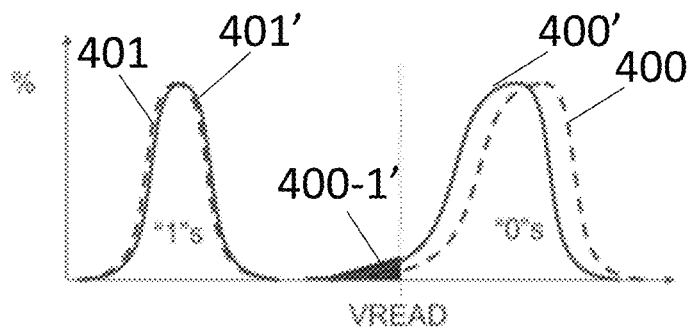
Figure 4C:
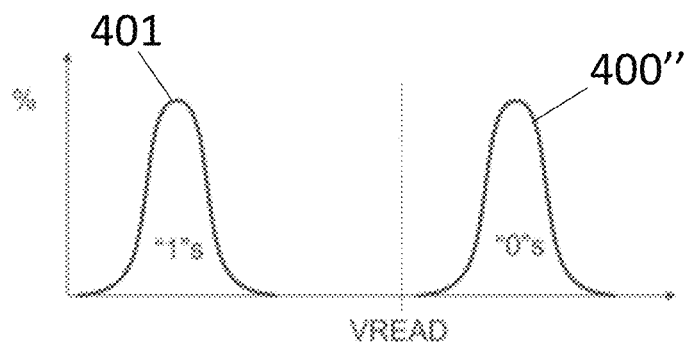

FIG. 4a-4c illustrate threshold voltage distributions of memory cells of a device that supports data scrubbing capability in accordance with embodiments of the present disclosure. For example, memory cells that support data scrubbing capability may be the memory cells 105, 220 described with reference to FIGS. 1-2. Threshold voltage distributions illustrated therein can be the threshold voltage distribution 300, 301 described with reference to FIGS. 3a-3c. For sake of brevity the description is not repeated here. It is understood that the aspects and concepts described above apply, mutatis mutandis, to the embodiment here described.

FIG. 4a illustrates threshold voltage distributions of memory cells of a device that supports data scrubbing capability in accordance with embodiments of the present disclosure. In this example, a gaussian distribution 400 represents the distribution of the memory cells in a state "0", a gaussian distribution 401 represents the distribution of the memory cells in a state "1" and VREAD is a positive voltage used to distinguish cells in state "1" from cells in state "0". Some memory cells of the device programmed to state "0", located in the portion 400-1 of the threshold voltage distribution 400, have a threshold voltage lower than VREAD.

In the case of threshold voltage distributions of FIG. 4a, a read operation of the memory cells can be performed without errors or with errors correctable by an embedded Error Correction Code (ECC).

FIG. 4b illustrates threshold voltage distributions of memory cells of a device shown in FIG. 4a after reading many times. Each read operation performed on the same memory cells increases read disturbs, i.e. Raw Bit Error Rate (RBER), and generic read errors rate, and the memory cells programmed to a distribution shift toward a different state over time. In this example the distribution 401 drifts toward the distribution 401', the distribution 400 shifts toward the distribution 400' and the number of memory cells located in the portion 400-1' of the threshold voltage distribution 400' become higher than the number of cells located in the portion 400-1 of the threshold voltage distribution 400.

In the case of threshold voltage distributions of FIG. 4b, a read operation of the memory cells can be performed without errors, with errors correctable by an embedded ECC or with errors non-correctable by an ECC.

To perform a read operation without errors or with errors correctable by an embedded ECC, a memory embedded management technique can be used to control the RBER increase by refreshing memory cells through a scrub operation, according to an embodiment of the present disclosure.

FIG. 4c illustrates threshold voltage distributions of memory cells shown in FIGS. 4a-4b after reading many times when a memory embedded management technique is used to control the RBER increase by refreshing memory cells through a scrub operation. In this example, the distribution 401 does not drifts towards another distribution, the distribution 400 drift toward the distribution 400", and no memory cells of the device programmed to state "0" have a threshold voltage lower than VREAD.

In the case of threshold voltage distributions of FIG. 4c, a read operation of the memory cells can be performed without errors.

Figure 5:
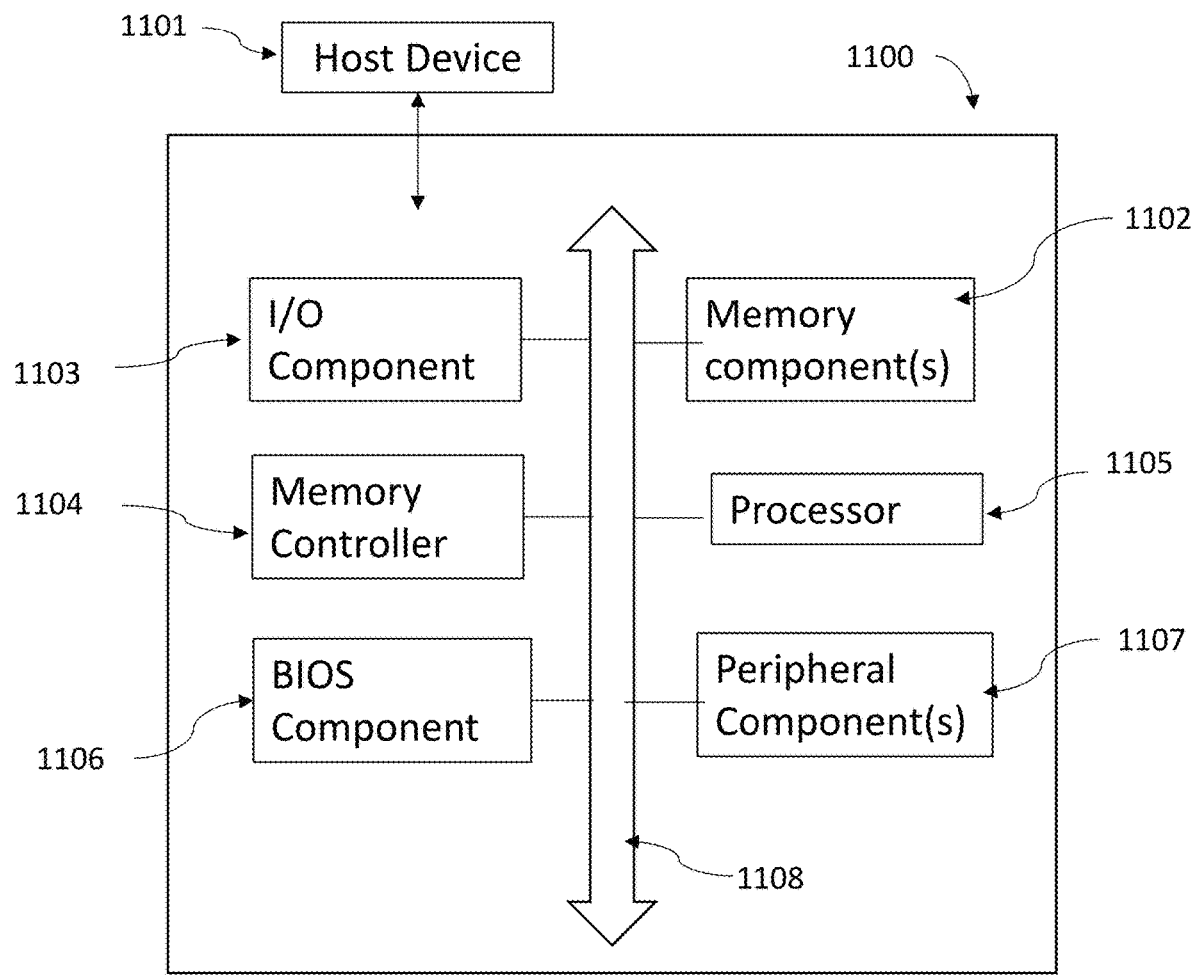
FIG. 5 illustrates an example of a device that supports data scrubbing capability in accordance with embodiments of the present disclosure.

FIG. 5 illustrates an example of a device that supports data scrubbing capability in accordance with embodiments of the present disclosure. Device 1100, which may be or include a printed circuit board to connect or physically support various components. Device 1100 may be a computer, laptop computer, notebook computer, tablet computer, mobile phone, or the like, in some examples.

Device 1100 comprises memory components 1102 having one or more arrays of memory cells, which may be for example the memory array 102 described with reference to FIG. 1 and the memory array 200 described with reference to FIG. 2. Memory cells may comprise analog memory units including pluralities of memory cells with respective programming sensitivity different from the respective programming sensitivity of other memory cells in the unit.

Device 1100 may also include an input/output (I/O) component 1103, a memory controller 1104, a processor 1105, a BIOS component 1106, peripheral component(s) 1107. The components of device 1100 may be in electronic communication with one another through a bus 1108.

The Input/Output component 1003 may be for example the Input/Output 135 shown in FIG. 1. Commands, addresses and data may be exchanged by device 1100 with other devices, such as a host device 1101. For example, device 1100 may receive through Input/Output component 1103 programming instructions and data. In another example, during an access phase, device 1100 may receive at Input/Output component 1103 read instructions and corresponding address and it may provide at Input/Output component 1103 an output with the result of the access (e.g., read) operation.

The Input/Output component 1103 may manage data communication between processor 1105 and peripheral component(s) 1107 not integrated into device 1100. In some cases, Input/Output component 1103 may represent a physical connection or port to the external peripheral.

The memory controller 1104 may be configured to operate with the host device 1101 and may manage the memory components 1102.

The processor 1105 may be configured to operate memory array 1102 through memory controller 1104. In some cases, the processor 1105 may perform the functions of memory controller 140 described with reference to FIG. 1. In other cases, the memory controller 140 may be integrated into the processor 1105. The processor 1105 may be a general-purpose processor, a digital signal processor (DSP), an application-specific integrated circuit (ASIC), a field-programmable gate array (FPGA) or other programmable logic device, discrete gate or transistor logic, discrete hardware components, or it may be a combination of these types of components, and it may perform various functions described herein.

The BIOS component 1106 may be a software component that includes a basic input/output system (BIOS) operated as firmware, which may initialize and run various hardware components of system. BIOS component 1106 may also manage data flow between processor 1105 and the various components, e.g., peripheral components 1107, input/output controller 1104, etc. BIOS component 1106 may include a program or software stored in read-only memory (ROM), flash memory, or any other non-volatile memory.

Peripheral component(s) 1107 may be any input or output device, or an interface for such devices, that is integrated into device 1100. Examples may include disk controllers, sound controller, graphics controller, Ethernet controller, modem, universal serial bus (USB) controller, a serial or parallel port, or peripheral card slots, such as peripheral component interconnect (PCI) or accelerated graphics port (AGP) slots.

The components of memory controller 1104, device 1101, and memory cells 1102 may be made up of circuitry designed to carry out their functions. This may include various circuit elements, for example, conductive lines, transistors, capacitors, inductors, resistors, amplifiers, or other active or inactive elements, configured to carry out the functions described herein.

Figure 6:
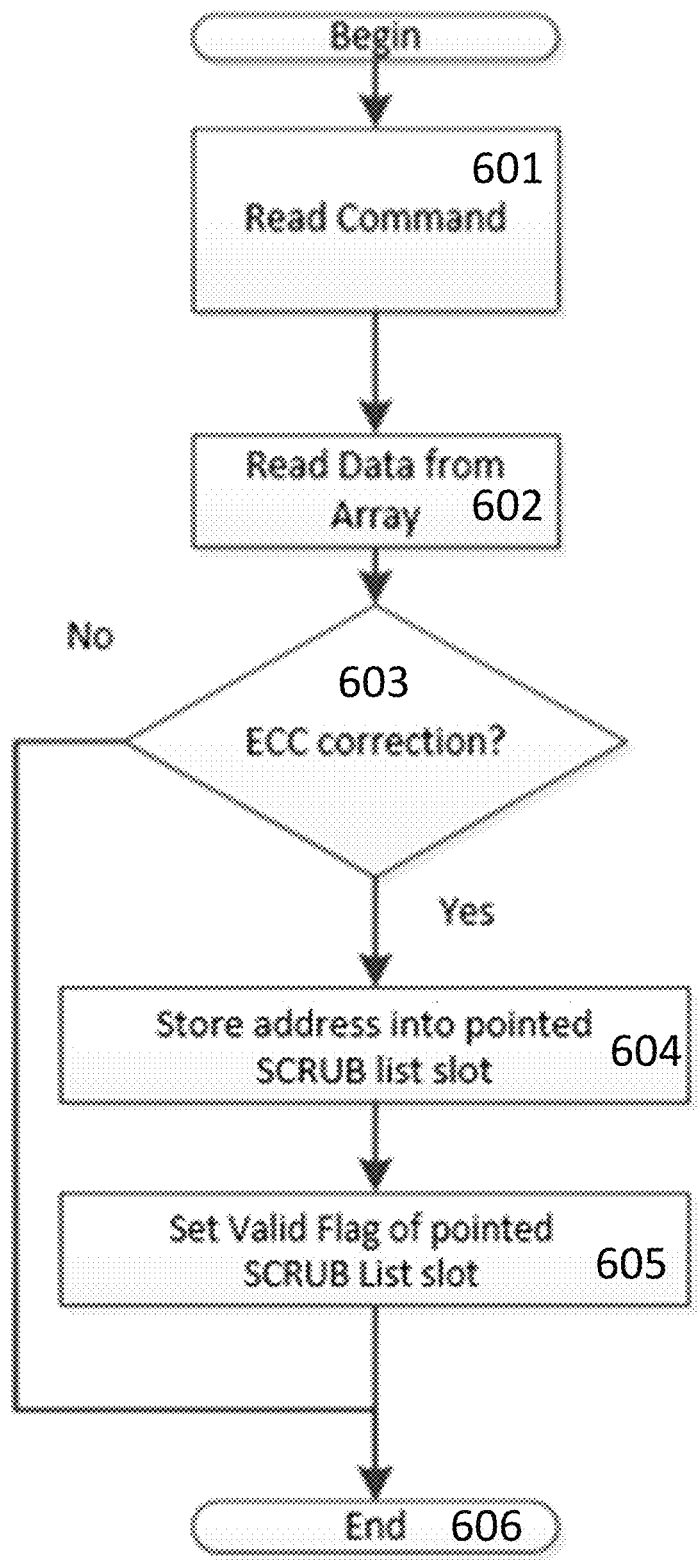
FIGS. 6 and 7 illustrate flowcharts showing a method to perform data scrub operations in accordance with embodiments of the present disclosure.
Figure 7:
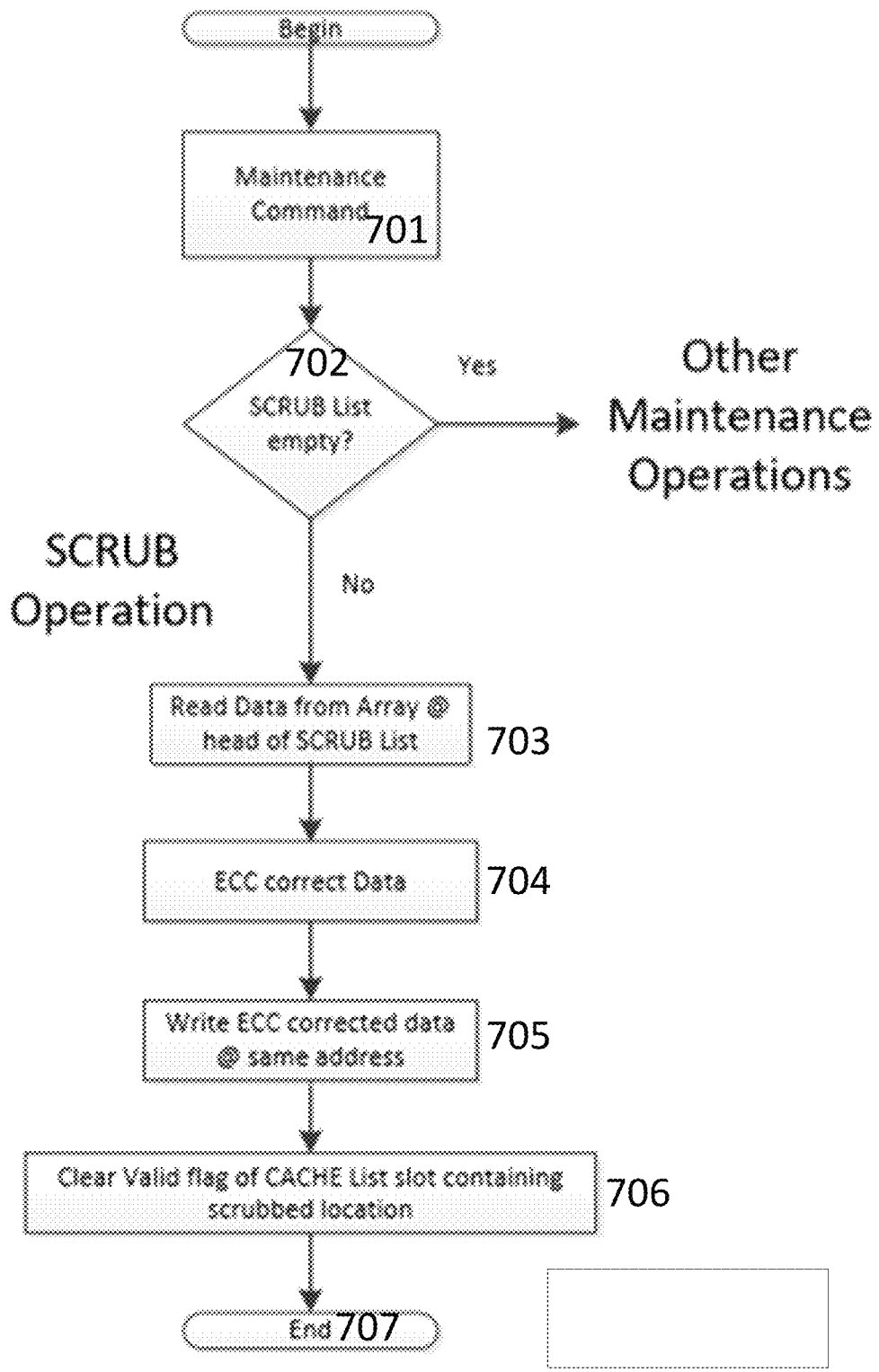

FIGS. 6 and 7 illustrate flowcharts showing a method to perform data scrub operations in accordance with embodiments of the present disclosure to correct the threshold voltage distributions of FIGS. 4a-4b and generate the threshold voltage distributions of FIG. 4c.

FIG. 6 illustrates a flowchart of a first phase of the method to control the RBER increase by refreshing memory cells through a scrub operation. When a read command 601 is received from a host/user a read operation is performed on a memory array and the data are read from the array 602. When the read operation is successful and the ECC correction 603 has not been used the read operation ends 606. The memory array here described can be, for example, the memory arrays 120, 200 or a portion thereof described with reference to FIGS. 1-2.

Instead, when the read operation is successful, but the ECC correction 603 has been used, information about memory locations, i.e. address, and optionally data stored in the memory location, is flagged and added to a scrub list as a location to be scrubbed, i.e. refreshed, during a scrub operation. In details, if the ECC correction 603 has been used, the address is stored into the pointed scrub list slot 604, a valid flag of a pointed scrub list slot is set 605 and the read operation ends 606. Alternatively, the steps of storing the address into the pointed scrub list slot 604 and setting a valid flag of a pointed scrub list slot 605 may be performed in parallel.

The error threshold at which a page/information about memory locations of the memory array is flagged for scrub is selectable based on the margin desired with respect to the correction power of the ECC engine. The expression "page of a memory array" as used in this disclosure must be intended as including a page of a portion of the memory array or/and a page of a single memory cells.

The scrub list may be stored in a scrub memory configured to selectively store information about main memory locations approaching a status with data uncorrectable by the ECC engine and/or to store the data stored in the memory locations corrected with the ECC engine.

FIG. 7 illustrates a flowchart of a second phase of the method to control the RBER increase by refreshing memory cells through a scrub operation. This second phase is performed during a maintenance operation which can be performed on request, before the memory is turned off, or when the memory is not performing other functional operations, i.e. data reading, data writing, data correction, etc. The request of the maintenance operation can be done by a host, an external or embedded memory controller or memory manager, etc.

When a maintenance command 701 is received, a check of the status of the scrub list 702 is performed. If the scrub list is empty, other maintenance operations are performed. If the scrub list is not empty, a scrub operation is performed.

In a first step 703 of a scrub operation, the data stored in the scrub list are sequentially read. In this embodiment of the present disclosure only the information on the memory locations is stored into the scrub list, thus after the reading of the address of the location to scrub, the data stored thereon are read and corrected with the ECC engine, step 704. After the data correction, the corrected data are written at the address of the location to scrub, step 705, and the valid flag of cache/scrub list slot containing the scrubbed location is cleared, step 706.

In this embodiment the scrub operation is power and time consuming because it is necessary to read the address of the location to scrub and the data stored in the locations to scrub, activate the ECC engine and correct the data, write the corrected data in the locations to scrub.

In another embodiment of the present disclosure, not shown in FIG. 7, both the information on the memory locations and data stored in the memory location corrected with the ECC engine are stored into the scrub list. In this embodiment, during the reading of the address of the location to scrub, step 703, also the data stored in the location to scrub corrected with the ECC engine are read. Since no data correction is necessary, the corrected data are directly written at the address of the location to scrub, step 705, and the valid flag of cache/scrub list slot containing the scrubbed location is cleared, step 706.

In this last embodiment the power and time consumption during the scrub operation is reduced because the ECC engine is not used since the scrub memory store the corrected data to write in the location to scrub. As a drawback, the scrub list to be stored in a scrub memory has a greater size and the space consumption on the memory array is increased.

FIGS. 8 and 9 illustrate examples of mode registers for a memory device that supports data scrubbing capability in accordance with embodiments of the present disclosure. The mode registers shown in FIGS. 8 and 9 can be configured to store usage information and to be accessible to an external controller. The external controller may use the usage information stored in the registers to perform the method described with reference to FIGS. 6 and 7.

Mode registers may be specific for a single bank group (BG) of the memory device or may be common to all bank groups (BGs). In the first case a high number of mode registers is required, a maintenance command could be issued only to the bank group that requires it while a maintenance operation is performed only on the banks that require it, with less impact on the command bandwidth. In the second case a low number of mode registers is required, a maintenance command could be issued to the bank group that does not require it while a maintenance operation is performed only on the banks that require it, with a waste of the command bandwidth.

In detail, FIG. 8 illustrates an example of mode register, in detail a mode register configured to store usage information regarding a maintenance command count (nMC) function and FIG. 9 illustrates an example of mode register, in detail a mode register configured to store usage information regarding an average maintenance interval (tMI) function. Both these parameters, i.e. the maintenance command count (nMC) and the average maintenance interval (tMI), indicate to the memory controller the maintenance command requirements on the basis of the actual Read/Write activity.

The memory controller needs to know the number of maintenance commands (nMC) required. Therefore, to know the nMC, the memory controller may adopt different policies, for example it may periodically poll the nMC mode register for a single bank group or for all bank groups, or it may poll the nMC mode register upon alert signal notification about a new value, or it may calculate the value based on the bank group or device Read/Write traffic. In details, the number of maintenance commands (nMC) may be calculated on the basis of Read/Write traffic, i.e. number of Write commands (nW) and number of Read commands (nR), as follow:

$$nMC = \text{Sum}(nMC_w, nMC_r) \quad (1)$$

wherein:

$$nMC_w = nW/100 \quad (2)$$

and wherein:

$$nMC_r = nR/1000 \quad (3)$$

In both cases, the scheduler completes the sequence of Read/Write commands with the proper number of maintenance commands (nMC). Furthermore the memory controller may push out or pull in the maintenance of a specific bank group.

The average maintenance interval (tMI) is the average interval between two maintenance commands of the memory controller. The value of the average maintenance interval (tMI) is based on the architectural parameters of the device, the reliability capabilities, and the Read/Write activity. The memory controller needs to know the number of maintenance interval (tMI) required. Therefore, to know the tMI, the memory controller may adopt different policies, for example it may periodically poll the tMI mode register for a single bank group or for all bank groups, or it may poll the tMI mode register upon alert signal notification about a new value, or it may calculate the value based on the bank group or device Read/Write traffic. In details, the maintenance interval (tMI) may be calculated on the basis of the number of maintenance commands (nMC) as follow:

$$tMI = \text{Time window}/nMC \quad (4).$$

Furthermore, the average maintenance interval (tMI) between two maintenance commands is related with scrub list size since the number of entries of the scrub list is a function of the average maintenance interval (tMI). In details, the scrub list size may be calculated as follow:

$$\text{Scrub list size [bits]} = \text{Scrub list slots} \times \text{Scrub list slot size} \quad (5)$$

wherein the:

$$\text{Scrub list slots [minimum number]} = tMI[s]/\text{Average Read Error rate [s]} \quad (6)$$

and wherein the scrub list slot size may be calculated as:

$$\text{Scrub list slot size [bits]} = \text{Page Address bits} + \text{Valid Flag} \quad (7)$$

when only the information on the memory locations is stored into the scrub list, as described with reference to FIG. 7, or alternatively as:

$$\text{Scrub list slot size [bits]} = \text{Page Data bits} + \text{Page Address bits} + \text{Valid Flag} \quad (8)$$

when both the information on the memory locations and data stored in the memory location corrected with the ECC engine are stored into the scrub list, as previously described.

The abovementioned usage information stored in the mode registers can be about required maintenance command count and/or required maintenance interval for the memory device and/or individual banks of the memory device described with reference to FIGS. 1-2.

Furthermore, the usage information stored in the mode registers can be about a time lapse since a previously executed maintenance operation on the memory device and/or on individual banks of the memory device described with reference to FIGS. 1-2.

Figures 10, 11:
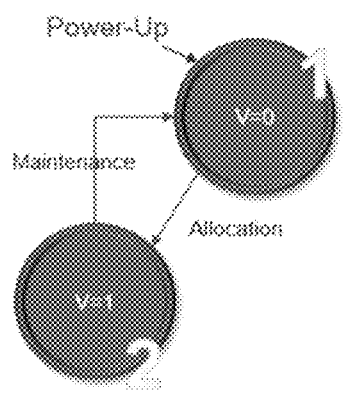
FIG. 10 illustrates a state diagram of a memory device that supports data scrubbing capability in accordance with embodiments of the present disclosure.
FIG. 11 illustrates an example of a command protocol for a memory device that supports data scrubbing capability in accordance with embodiments of the present disclosure.

FIG. 10 illustrates a state diagram of a memory device, for example the memory device described with reference to FIGS. 1-2, that supports data scrubbing capability in accordance with embodiments of the present disclosure Maintenance and allocation states shown in the state diagram can be activated by an external or internal controller after checking the current state (1 or 2) of the memory device to perform the method described with reference to FIGS. 6-7.

Furthermore, when the memory device is in the maintenance state, the mode registers described with reference to FIGS. 7-8 can be accessed to request a maintenance operation, for example, to refresh the memory array at the address stored into the scrub list slot.

FIG. 11 illustrates an example of a command protocol for a memory device that supports data scrubbing capability in accordance with embodiments of the present disclosure. The command protocol can be used, for example, by an external controller to communicate with a memory device having memory cells that support data scrubbing, i.e. the memory cells 105, 220 described with reference to FIGS. 1-2.

The command protocol for a memory device comprises a maintenance command indicative of a request of multiple maintenance operations comprising an internal management, by the memory device, of selective correction of data at one or more main memory locations, the maintenance command exempts of indication of the one or more main memory locations.

The maintenance command further comprises a parameter indicative of a plurality of main memory locations the data of which to be selectively corrected.

Furthermore, the maintenance command could comprise one of a single operation maintenance command, a multiple operation maintenance command or an undetermined number operation maintenance command for instructing the memory device to enter a maintenance operation mode.

Figure 12A:
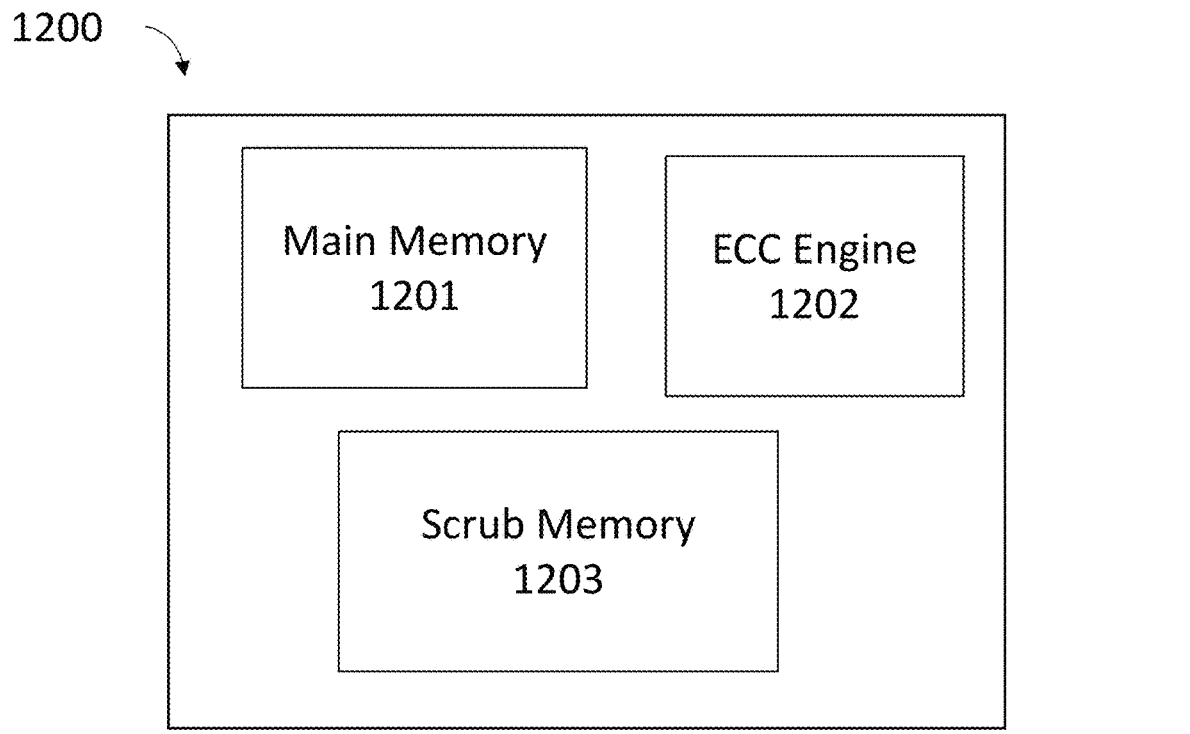
FIG. 12a illustrates a block diagram of a memory device that supports data scrubbing capability in accordance with embodiments of the present disclosure.

FIG. 12a illustrates a block diagram of a memory device that supports data scrubbing capability in accordance with embodiments of the present disclosure.

The memory device 1200 of FIG. 12a includes a main memory 1201 with main memory locations configured to store data, an internal Error Correction Code (ECC) engine 1202 for detecting and correcting errors, and a scrub memory 1203 configured to selectively store information about the main memory locations approaching a status with data uncorrectable by the ECC engine 1202.

The main memory 1201 and the scrub memory 1203 may be for example a memory array 102 as described with reference to FIG. 1 and array 200 in FIG. 2 or in accordance with other embodiments of this application.

The scrub memory 1203 is the scrub memory described with reference to the method that support data scrubbing capability described with reference to FIGS. 6-7 and may be a volatile memory or a non-volatile memory.

Figure 12B:
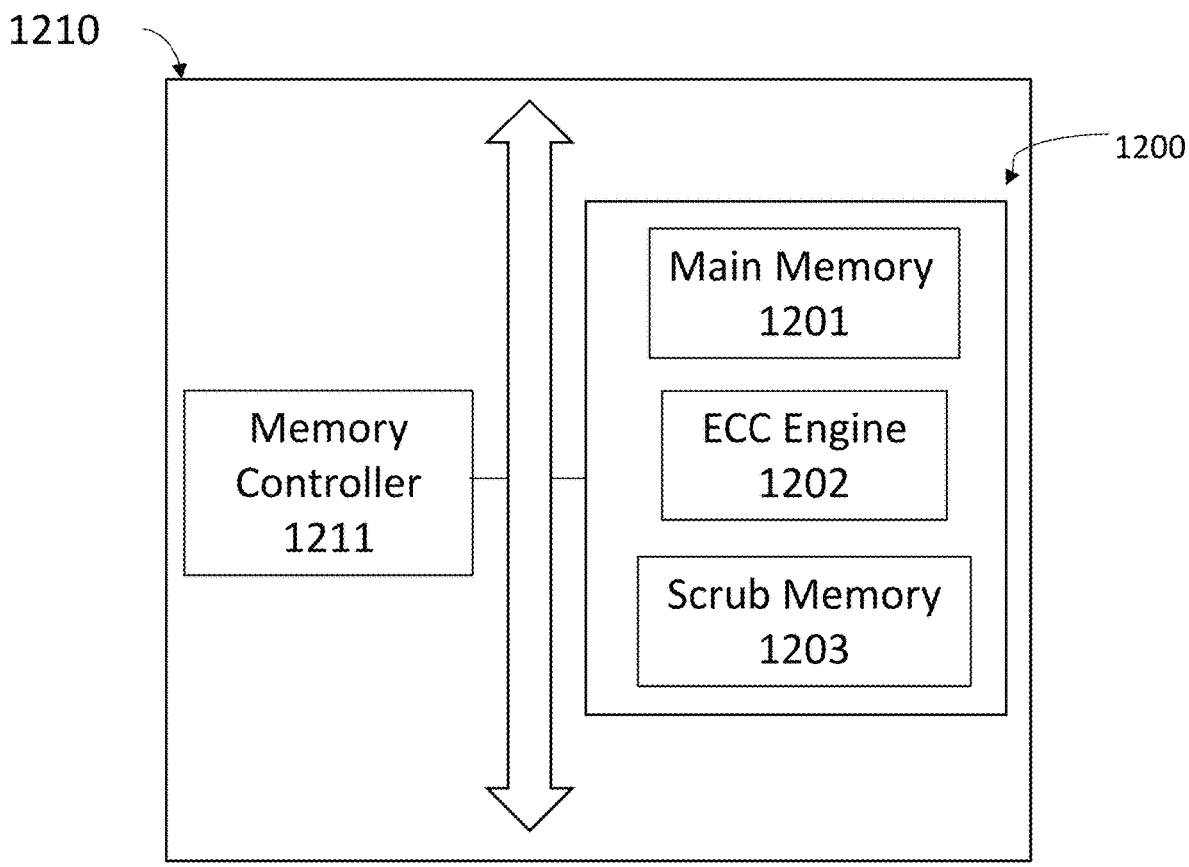
FIG. 12b illustrates a block diagram of a system comprising a memory device that supports data scrubbing capability in accordance with embodiments of the present disclosure.

FIG. 12b illustrates a block diagram of a system comprising a memory device that supports data scrubbing capability in accordance with embodiments of the present disclosure, for example the memory device 1200 described with reference to FIG. 12a.

The system 1210 of FIG. 12b comprises a memory device 1200 and a memory controller 1211 coupled to the memory device 1200.

The memory device 1200, as described above, may comprise a main memory 1201 with main memory locations configured to store data, an internal Error Correction Code (ECC) engine 1202 for detecting and correcting data errors, and a scrub memory 1203 configured to selectively store information about main memory locations approaching a status with data uncorrectable by the ECC engine 1202.

Furthermore, the memory device 1200 may comprise one or more mode registers, for example the mode register shown in FIGS. 8 and 9, said mode register being accessible to the memory controller 1211 configured to store usage information about required maintenance command count and/or required maintenance interval for the memory device 1200 and/or individual banks of the memory device 1200.

The memory controller 1211 may be an external controller and may manage the memory device 1200 components and accede to the usage information stored in the mode registers described with reference to FIGS. 8 and 9. Furthermore, the memory controller 1211 may command the activation and execution of the maintenance mode, as described with reference to FIG. 10, to perform the method described with reference to FIGS. 6 and 7.

The memory controller 1211 of the system 1210 is configured to issue a maintenance command to the memory device 1200 for initiating, by the memory device 1200, a plurality of maintenance operations including a scrub operation of at least one main memory location, wherein the maintenance command is exempt of indications about main memory location to be scrubbed. The maintenance command may be based on one of a time lapse interval, a count of access operations, a hotness of data exchanged, an interrogation of mode registers of the memory device 1200, or a combination thereof. For issuing a maintenance command, the memory controller 1211 may keep track of a read hotness in the case of a scrub operation, or a write hotness in the case of different maintenance operations or may interrogate the memory device 1200 by reading the registers.

In an embodiment of the present disclosure the memory device 1200 of the system 1210 may be configured to autonomously carry out the scrub operation comprising a step of retrieving from the scrub memory 1203 information corresponding to one or more main memory location(s) and a step of storing the corrected data at the one or more main memory location(s) based at least in part on the information.

In detail, the step of retrieving information from the scrub memory 1203 may comprise a step of reading one or more addresses of the main memory location(s) while the step of storing corrected data may comprise steps of: accessing the main memory location(s) at the one or more addresses, reading data from the accessed main memory location(s), error correcting the read data to obtain the corrected data, and storing the corrected data at the one or more addresses of the main memory location(s), or reading the corrected data from the scrub memory 1203 and storing the corrected data at the one or more addresses of the main memory location(s).

In another embodiment of the present disclosure, the memory device 1200 is configured, based on a read command received for example from the memory controller 1211, to access a main memory location at an address indicated in the read command, to read data from the main memory location, to error correct the read data using the ECC engine 1202, and to store information about the main memory location in the scrub memory 1203, based on meeting or exceeding an ECC threshold. The stored information comprises the error corrected read data.

In another embodiment of the present disclosure, the memory device 1200 is configured, based on a maintenance command received for example from the memory controller 1211, to access the scrub memory 1203 and if the scrub memory 1203 is empty to continue with other maintenance operations or if the scrub memory 1203 is not empty, to read information of at least a main memory location from the scrub memory 1203 and to store the corrected data at the main memory location. Based on the storing the corrected data at the main memory location, the memory device 1200 is further configured to remove information about the main memory location from the scrub memory 1203.

In a further embodiment of the present disclosure, the memory device 1200 is configured to read from the scrub memory 1203 information of main memory locations and to store the corrected data at the main memory locations during a power-down sequence.

In detail, the operation of reading information from the scrub memory 1203 may comprise reading one or more addresses of the main memory locations. Furthermore, the operation of storing corrected data may comprise the steps of: accessing the main memory locations at the one or more addresses, reading data from the accessed main memory locations, error correcting the read data to obtain the corrected data, and storing the corrected data at the one or more addresses of the main memory locations, or the steps of: reading the corrected data from the scrub memory and storing the corrected data at the one or more addresses of the main memory locations.

In another embodiment of the present disclosure, the memory device 1200 may be configured to block access to one or more banks of the memory device based on information in the scrub memory 1203 being indicative of a need to receive a maintenance command to perform a scrub operation in the one or more banks of the memory device.

Figure 13B:
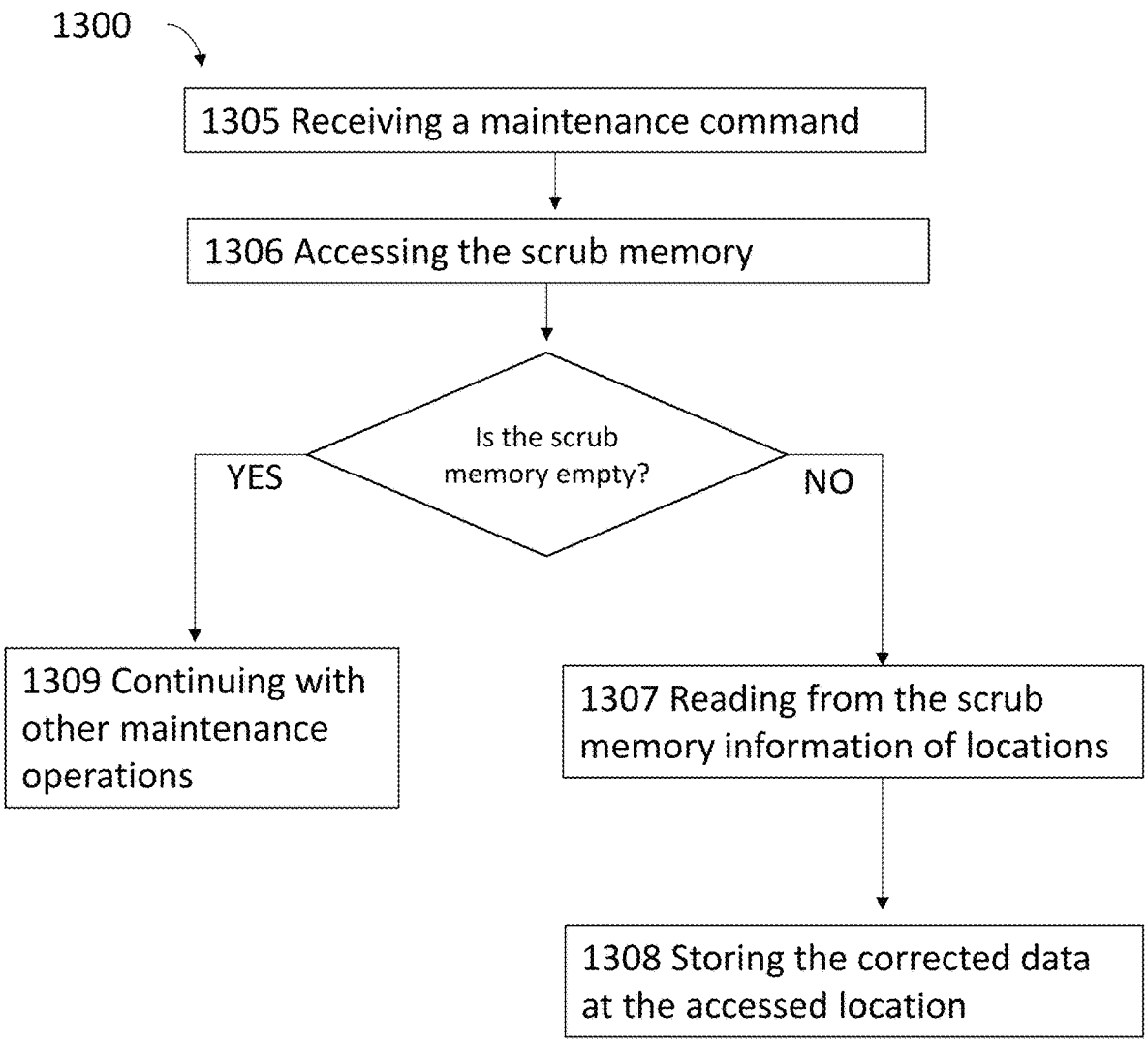
Figure 13C:
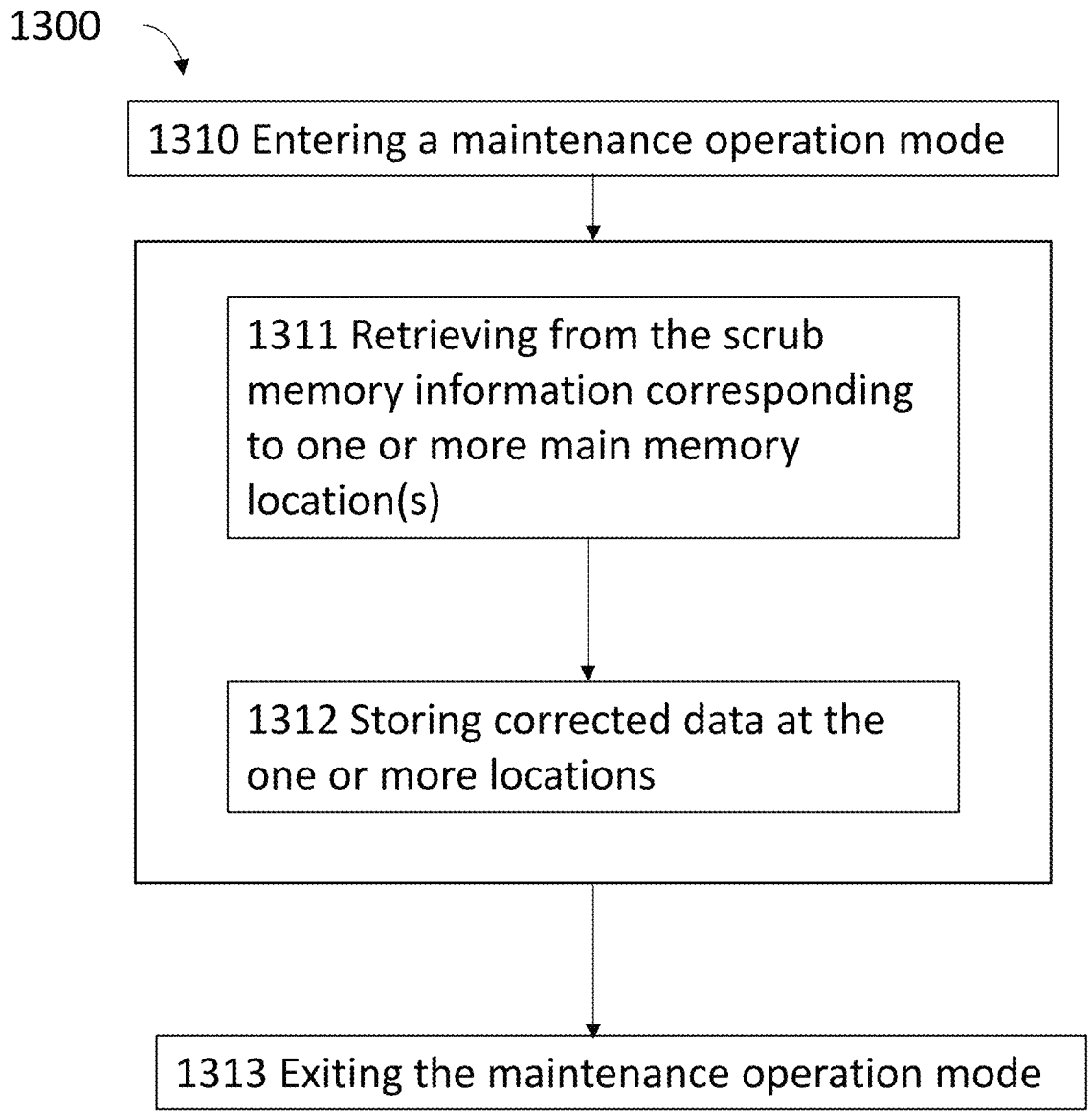

FIGS. 13*a*-13*c* show flowcharts illustrating several embodiments of a method to operate a memory device that supports scrubbing capability in accordance with the present disclosure; said methods being used for example to operate the memory device 1200 having a main memory 1201 and a scrub memory 1203 and described with reference to FIG. 12*a*.

FIG. 13*a* shows a first embodiment of the method 1300 to operate a memory device that supports scrubbing capability, wherein the method 1300 comprises a step 1301 of receiving a read command for example from a memory controller 1211, a step 1302 of accessing a location in the main memory to read data at the location based on the receiving the read command, a step 1303 of error correcting data read during the accessing, and a step 1304 of storing at the scrub memory information of the location based at least in part on the correcting the data meeting or exceeding an ECC threshold.

Furthermore, if the storing of the step 1304 is based on verifying that the information is not already present, the method 1300 further comprises a step of verifying whether the information is already present in scrub memory 1203.

FIG. 13*b* shows another embodiment of the method to operate a memory device that supports scrubbing capability, wherein the method 1300 further comprises a step 1305 of receiving a maintenance command, a step 1306 of accessing the scrub memory based on the receiving the maintenance command, and if the scrub memory is empty, a step 1309 of continuing with other maintenance operations or, if the scrub memory is not empty, a step 1307 of reading from the scrub memory information of locations, and a step 1308 of storing the corrected data at the accessed location.

In the method described with reference to FIG. 13*b*, the step 1307 of reading information from the scrub memory 1203 may comprise reading one or more addresses of the main memory locations. Furthermore, the step 1308 of storing corrected data may comprise the steps of: accessing the main memory locations at the one or more addresses, reading data from the accessed main memory locations, error correcting the read data to obtain the corrected data, and storing the corrected data at the one or more addresses of the main memory locations, or the steps of: reading the corrected data from the scrub memory and storing the corrected data at the one or more addresses of the main memory locations.

The method described with reference to FIGS. 13*a*-13*b* may further comprise the steps of accessing other main memory locations whose information is stored in the scrub memory region, reading data from the other main memory locations, error correcting the read data, and storing the corrected data in the other main memory locations until either the scrub memory region is empty, or a number of the other main memory locations equals or exceeds a value. Said value being based, at least in part, on a parameter comprised in the maintenance command received in step 1305.

FIG. 13*c* shows another embodiment of the method 1300 to operate a memory device that supports scrubbing capability, wherein the method 1300 further comprises a step 1310 of entering a maintenance operation mode, and while in the maintenance operation mode, a step 1311 of retrieving from the scrub memory information corresponding to one or more main memory location(s), a step 1312 of storing corrected data at the one or more locations, and a step 1313 of exiting the maintenance operation mode.

In the method described with reference to FIG. 13*c*, the step 1311 of retrieving information from the scrub memory comprises reading one or more addresses of the one or more main memory location(s). Furthermore, the step 1312 of storing corrected data comprises the steps of: accessing the one or more corresponding locations, reading data from the accessed one or more locations, error correcting the read data to obtain the corrected data, and storing the corrected data at the one or more locations, or the steps of: reading the corrected data from the scrub memory and storing the corrected data at the one or more locations.

In the method 1300 described with reference to FIG. 13*c*, the step 1310 of entering the maintenance operation mode may be based on receiving one of a single operation maintenance command, a multiple operation maintenance command, or an undetermined number operation maintenance command.

In addition, in the method 1300 described with reference to FIG. 13c, the step 1313 of exiting the maintenance operation mode may be based on one of lapsing of a maintenance operation latency time, completing a number of maintenance operations, wherein the number is based on a parameter received with the multiple operation maintenance command, or receiving an end-of-maintenance command.

In another embodiment, the method 1300 to operate a memory device that supports scrubbing capability further comprise the step of providing in mode registers accessible to an external controller, said mode registers containing information about required maintenance command count and/or required maintenance interval for the memory device and/or to individual banks of the memory device and/or information about a time lapse since a previously executed maintenance operation on the memory device and/or on individual banks of the memory device.

The method 1300 described in the present disclosure may be performed by an apparatus which may include means for accessing a plurality of memory cells each respective memory cell in the plurality of memory cells with a respective programming sensitivity different from the respective programming sensitivity of other cells in the plurality, means for applying one or more programming pulses to the plurality of memory cells, and means for storing respective analog information in each respective memory cell based at least in part on the applying the one or more programming pulses.

It should be noted that the methods described above describe possible implementations, and that the operations and the steps may be rearranged or otherwise modified and that other implementations are possible. Furthermore, embodiments from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The term "electronic communication" and "coupled" refer to a relationship between components that support electron flow between the components. This may include a direct connection between components or may include intermediate components. Components in electronic communication or coupled to one another may be actively exchanging electrons or signals (e.g., in an energized circuit) or may not be actively exchanging electrons or signals (e.g., in a de-energized circuit) but may be configured and operable to exchange electrons or signals upon a circuit being energized. By way of example, two components physically connected via a switch (e.g., a transistor) are in electronic communication or may be coupled regardless of the state of the switch (i.e., open or closed).

As used herein, the term "substantially" means that the modified characteristic (e.g., a verb or adjective modified by the term substantially) need not be absolute but is close enough so as to achieve the advantages of the characteristic.

As used herein, the term "electrode" may refer to an electrical conductor, and in some cases, may be employed as an electrical contact to a memory cell or other component of a memory array. An electrode may include a trace, wire, conductive line, conductive layer, or the like that provides a conductive path between elements or components of memory array.

The term "isolated" refers to a relationship between components in which electrons are not presently capable of flowing between them; components are isolated from each other if there is an open circuit between them. For example, two components physically connected by a switch may be isolated from each other when the switch is open.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory device, comprising:
    a main memory with main memory locations configured to store data;
    an internal error correction code (ECC) engine for detecting and correcting errors;
    one or more mode registers accessible to an external controller and configured to store usage information about a required maintenance command count, wherein the required maintenance command count is based on a number of read and write commands, wherein the external controller is configured to issue a maintenance command based on an interrogation of the mode registers, and wherein a sequence of read/write commands is scheduled with a number of maintenance commands based on the required maintenance command count; and
    a scrub memory configured to selectively store information about main memory locations, wherein the information is associated with error correction performed by the ECC engine.

2. The memory device of claim 1, wherein the scrub memory comprises volatile memory.

3. The memory device of claim 1, wherein the scrub memory comprises non-volatile memory.

4. The memory device of claim 1, wherein the memory device, based on receiving a read command, is configured to:
    access a main memory location at an address indicated in the read command;
    read data from the main memory location;
    error correct the read data; and
    store information about the main memory location in the scrub memory, based on meeting or exceeding an ECC threshold.

5. The memory device of claim 1, wherein the information about the main memory locations comprises error corrected read data.

6. The memory device of claim 1, wherein the memory device, based on receiving the maintenance command, is configured to:
    access the scrub memory; and
    continue with other maintenance operations if scrub memory is empty, or if scrub memory is not empty:
        read information of at least a main memory location from the scrub memory; and
        store corrected data at the main memory location.

7. The memory device of claim 6, further configured to remove, from the scrub memory, information about the main memory location based on storing the corrected data at the main memory location.

8. The memory device of claim 1, wherein the memory device is configured, during a power-down sequence, to:
    read, from the scrub memory, information of main memory locations; and
    store corrected data at the main memory locations.

9. The memory device of claim 8, wherein reading information from the scrub memory comprises reading one or more addresses of main memory locations; and storing corrected data comprises:
    accessing the main memory locations at the one or more addresses;
    reading data from the accessed main memory locations; and
    either:
        correcting errors in the read data to obtain the corrected data; and
        storing the corrected data at the one or more addresses of the main memory locations;
    or:
        reading the corrected data from the scrub memory; and
        storing the corrected data at the one or more addresses of the main memory locations.

10. The memory device of claim 1, wherein the mode registers are further configured to store usage information about at least one of required maintenance interval for the memory device, or individual banks of the memory device.

11. The memory device of claim 1, configured to block access to one or more banks of the memory device based on information in the scrub memory being indicative of a need to receive a maintenance command to perform a scrub operation in the one or more banks of the memory device.

12. The memory device of claim 1, wherein the maintenance command is exempt of indications about main memory location to be scrubbed.

13. The memory device of claim 12, wherein the external controller is further configured to issue the maintenance command based on a count of access operations.

14. The memory device of claim 1, wherein the memory device is configured to autonomously carry out a scrub operation comprising:
    retrieving, from the scrub memory, information corresponding to one or more main memory location(s); and
    storing the corrected data at the one or more main memory location(s) based at least in part on the information.

15. The memory device of claim 14, wherein retrieving information from the scrub memory comprises reading one or more addresses of the main memory location(s), and storing corrected data comprises:
    accessing the main memory location(s) at the one or more addresses;
    reading data from the accessed main memory location(s);
    error correcting the read data to obtain the corrected data; and
    either storing the corrected data at the one or more addresses of the main memory location(s);
    or:
        reading the corrected data from the scrub memory; and
        storing the corrected data at the one or more addresses of the main memory location(s).

16. A method to operate a memory device, the memory device comprising a main memory and a scrub memory, the method comprising:
    receiving a read command;
    accessing, based on the receiving the read command, a location in the main memory to read data at the location;

correcting errors in data read during the accessing;
storing, at the scrub memory, information of the location based at least in part on the correcting the data meeting or exceeding an ECC threshold;
determining a required maintenance command count based on a number of read and write commands;
providing information in mode registers accessible to an external controller, the information including the required maintenance command count, wherein a sequence of read/write commands is scheduled with a number of maintenance commands based on the required maintenance command count; and
receiving a first maintenance command of the number of maintenance commands from the external controller, wherein the first maintenance command is issued by the external controller based on an interrogation of the mode registers.

17. The method of claim 16, further comprising verifying whether the information is already present in scrub memory, wherein storing is based on verifying that the information is not already present.

18. The method of claim 16, further comprising:
accessing the scrub memory, based on the receiving the first maintenance command; and
continuing with other maintenance operations if the scrub memory is empty, or if the scrub memory is not empty:
reading, from the scrub memory, information of locations, and storing the corrected data at the accessed location.

19. The method of claim 18, wherein reading information from the scrub memory comprises reading one or more addresses of locations and storing corrected data comprises:
accessing the locations at the one or more addresses;
reading data from the accessed locations; and
either:
correcting errors in the read data to obtain the corrected data; and
storing the corrected data at the one or more addresses of the locations;
or:
reading the corrected data from the scrub memory; and
storing the corrected data at the one or more addresses of the locations.

20. The method of claim 16, further comprising:
accessing other main memory locations whose information is stored in the scrub memory;
reading data from the other main memory locations;
error correcting the read data; and
storing the corrected data in the other main memory locations, until:
either the scrub memory is empty; or
a number of the other main memory locations equals or exceeds a value.

21. The method of claim 20, wherein said value is based at least in part on a parameter comprised in the first maintenance command.

22. The method of claim 16, further comprising:
entering a maintenance operation mode in response to receiving the first maintenance command; and
while in the maintenance operation mode:
retrieving, from the scrub memory, information corresponding to one or more main memory locations;
storing corrected data at the one or more locations; and
exiting the maintenance operation mode.

23. The method of claim 22, wherein retrieving information from the scrub memory comprises reading one or more addresses of the one or more main memory locations and storing corrected data comprises:
accessing the one or more corresponding locations;
reading data from the accessed one or more locations; and
either:
error correcting the read data to obtain the corrected data; and
storing the corrected data at the one or more locations;
or:
reading the corrected data from the scrub memory; and
storing the corrected data at the one or more locations.

24. The method of claim 22, wherein exiting the maintenance operation mode is based on completing a number of maintenance operations, the number based on a parameter received with the first maintenance command.

25. The method of claim 16, wherein the mode registers further provide information about required maintenance interval.

26. The method of claim 16, wherein the mode registers further provide information about a time lapse since a previously executed maintenance operation on the memory device, or on individual banks of the memory device, or any combination thereof.

27. A memory device configured to use a command protocol comprising a maintenance command indicative of a request of multiple maintenance operations comprising an internal management, by the memory device, of selective correction of data at one or more main memory locations, wherein:
the maintenance command is exempt of indications about the one or more main memory locations;
a required maintenance command count is determined based on a number of read and write commands;
the memory device comprises one or more mode registers configured to store information about the required maintenance command count;
a sequence of read/write commands is scheduled with a number of maintenance commands based on the required maintenance command count; and
the maintenance command is issued by an external controller based on an interrogation of the mode registers.

28. The memory device of claim 27, wherein the maintenance command comprises a parameter indicative of a number of main memory locations the data of which to be selectively corrected.

29. The memory device of claim 27, wherein the memory device is further configured to enter a maintenance operation mode in response to:
a single operation maintenance command;
a multiple operation maintenance command; or an undetermined number operation maintenance command.

* * * * *